(12) United States Patent
Suzawa et al.

(10) Patent No.: US 12,441,273 B2
(45) Date of Patent: Oct. 14, 2025

(54) VEHICLE KEY SYSTEM AND VEHICLE LOCKING METHOD

(71) Applicant: SUBARU CORPORATION, Tokyo (JP)

(72) Inventors: Shouta Suzawa, Tokyo (JP); Kazuki Tomimatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/323,198

(22) Filed: May 24, 2023

(65) Prior Publication Data

US 2023/0391287 A1 Dec. 7, 2023

(30) Foreign Application Priority Data

Jun. 3, 2022 (JP) .................... 2022-090946

(51) Int. Cl.
*B60R 25/24* (2013.01)
*B60R 25/01* (2013.01)
*G07C 9/00* (2020.01)

(52) U.S. Cl.
CPC .............. *B60R 25/24* (2013.01); *B60R 25/01* (2013.01); *G07C 9/00309* (2013.01); *B60R 2325/101* (2013.01); *B60R 2325/205* (2013.01); *G07C 2009/00793* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 9,536,365 B2* | 1/2017 | Wisnia | G08C 17/02 |
| 11,285,917 B1* | 3/2022 | Wisnia | H04K 3/92 |
| 2003/0122651 A1* | 7/2003 | Doi | G07C 9/00182 |
| | | | 340/5.7 |

(Continued)

FOREIGN PATENT DOCUMENTS

| | | |
|---|---|---|
| JP | 2011-231567 A | 11/2011 |
| JP | 2018-178604 A | 11/2018 |
| JP | 2021-167151 A | 10/2021 |

OTHER PUBLICATIONS

Subaru Levorg, Owner's Manual, "Unlocking with PIN code keyless entry" Jun. 2022, with partial English translation.

*Primary Examiner* — Carlos Garcia
(74) *Attorney, Agent, or Firm* — Rimon P.C.

(57) ABSTRACT

A vehicle key system is configured to change a lock status of a vehicle through communication performed between a user terminal and the vehicle. The vehicle key system includes one or more control circuits. The user terminal includes a terminal communication unit. The terminal communication unit is configured to communicate with the vehicle. The vehicle includes a vehicle communication unit and a vehicle opening-and-closing unit. The vehicle communication unit is configured to communicate with the user terminal. The one or more control circuits is configured to cause communication between the terminal communication unit and the vehicle communication unit to be stopped when an operation for putting the vehicle opening-and-closing unit into a locked state is performed, with the user terminal placed inside the vehicle.

6 Claims, 4 Drawing Sheets

(56) References Cited

U.S. PATENT DOCUMENTS

| | | | |
|---|---|---|---|
| 2022/0180679 A1* | 6/2022 | Wisnia | G07C 9/00571 |
| 2023/0043228 A1* | 2/2023 | Wisnia | B60R 25/245 |
| 2023/0391287 A1* | 12/2023 | Suzawa | B60R 25/24 |

* cited by examiner

VEHICLE KEY SYSTEM AND VEHICLE LOCKING METHOD

CROSS-REFERENCE TO RELATED APPLICATIONS

The present application claims priority from Japanese Patent Application No. 2022-090946 filed on Jun. 3, 2022, the entire contents of which are hereby incorporated by reference.

BACKGROUND

The disclosure relates to a vehicle key system and a vehicle locking method using the same.

An electronic key system for vehicular use is widespread. This kind of electronic key system locks and unlocks a vehicle by performing key authentication through wireless communication between a user's key terminal, which is portable, and an in-vehicle communication device. Such a system is sometimes called "smart entry system" or the like.

In an electronic key system, an in-vehicle communication device transmits a predetermined response request signal at periodic intervals, and, a key terminal, upon receiving the response request signal, transmits a predetermined response signal including unique identification information to the in-vehicle communication device. Upon receiving the response signal from the key terminal, the in-vehicle communication device collates it with pre-registered identification information to perform electronic key authentication. If the electronic key authentication is successful, the in-vehicle communication device unlocks doors of the vehicle that are in a locked state. The use of a smartphone having a call function as the key terminal, besides compact devices known as "smart key" in the art, is known.

By the way, among users who enjoy outdoor activity such as surfing and swimming, there is a demand for locking a vehicle, with a key terminal left inside the cabin of the vehicle. The reason is that doing outdoor activity with no worry while carrying the key terminal is difficult due to a risk of the key terminal being damaged or stolen. However, an electronic key system is designed on the presupposition that the user will bring the key terminal with them out of the vehicle after locking the vehicle. Therefore, if the key terminal is present inside the cabin of the vehicle, the vehicle will not be locked when the user performs a locking operation such as touching a touch sensor from outside the vehicle. For a solution, a system capable of locking and unlocking the vehicle cryptographically, with the key terminal left inside the cabin of the vehicle, has been developed. Such a system is disclosed in SUBARU LEVORG Owner's Manual, page 172, "Unlocking with PIN code keyless entry".

In addition, techniques for temporarily stopping communication of the key terminal, depending on conditions, are disclosed in Japanese Unexamined Patent Application Publication (JP-A) No. 2011-231567, JP-A No. 2018-178604, and JP-A No. 2021-167151.

SUMMARY

An aspect of the disclosure provides a vehicle key system configured to change a lock status of a vehicle through communication performed between a user terminal and the vehicle. The user terminal includes a terminal communication unit. The terminal communication unit is configured to communicate with the vehicle. The vehicle includes a vehicle communication unit and a vehicle opening-and-closing unit. The vehicle communication unit is configured to communicate with the user terminal. The vehicle key system includes one or more control circuits configured to cause communication between the terminal communication unit and the vehicle communication unit to be stopped when an operation for putting the vehicle opening-and-closing unit into a locked state is performed, with the user terminal placed inside the vehicle.

An aspect of the disclosure provides a vehicle locking method of changing lock status of a vehicle through communication performed between a user terminal and the vehicle. The user terminal includes a terminal communication unit. The terminal communication unit is configured to communicate with the vehicle. The vehicle includes a vehicle communication unit and a vehicle opening-and-closing unit. The vehicle communication unit is configured to communicate with the user terminal. The vehicle locking method includes stopping communication between the terminal communication unit and the vehicle communication unit when an operation for putting the vehicle opening-and-closing unit into a locked state is performed, with the user terminal placed inside the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the techniques disclosed in the aforementioned publications, there is a room for improvement in terms of security when the vehicle is locked.

For example, if the user locks and leaves the vehicle, with the key terminal left inside the cabin of the vehicle, there is a risk that the vehicle might be stolen. That is, if a third party breaks into the cabin of the vehicle by breaking a door glass and then operates a switch for starting an engine, the engine will start and, therefore, the vehicle might be stolen by the third party driving it away.

It is therefore desirable to provide a vehicle key system that ensures security even when the user terminal is left inside the cabin of the vehicle, and a vehicle locking method using the same.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
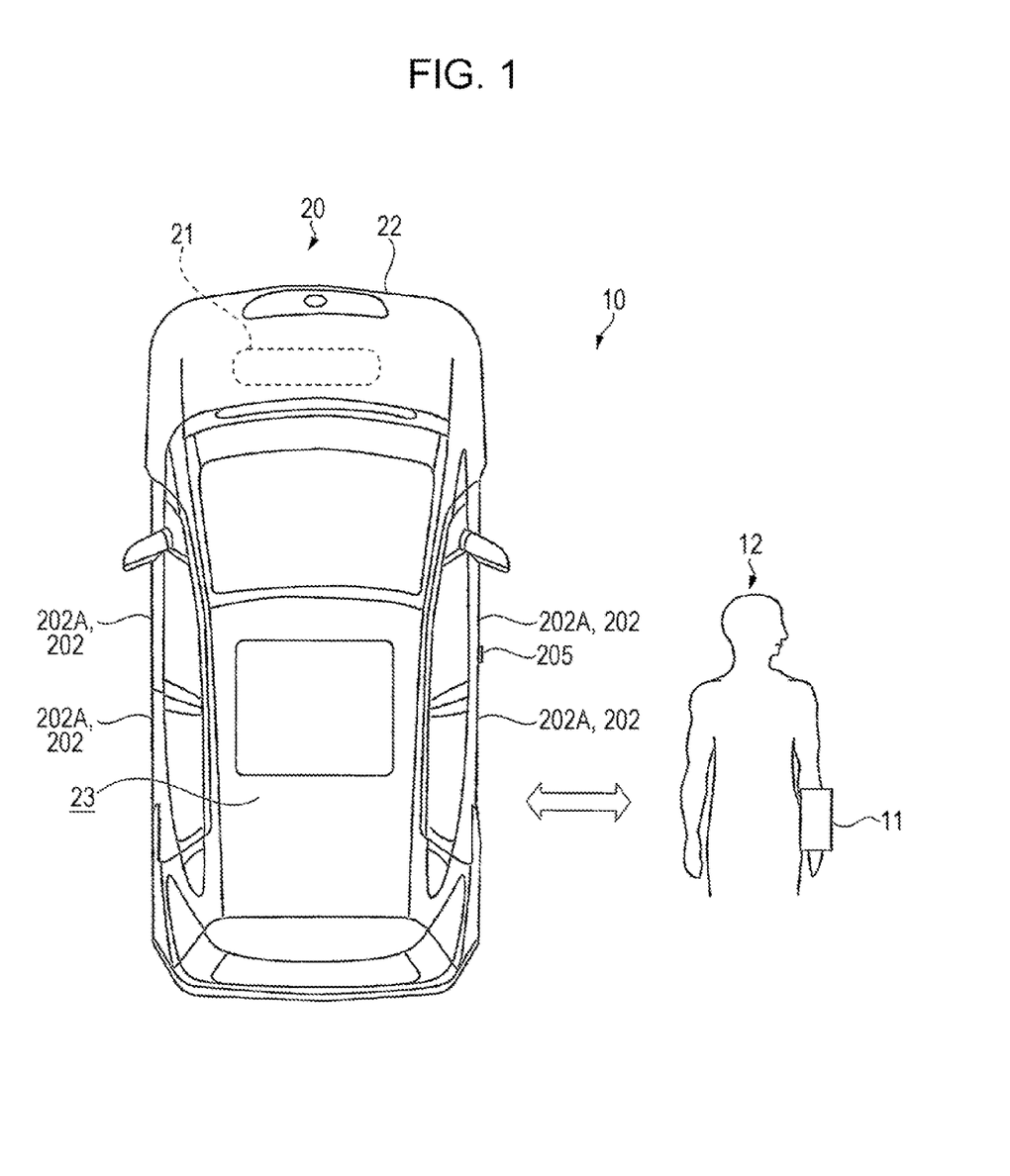
FIG. 1 is a schematic view of a vehicle key system according to an embodiment of the disclosure.

FIG. 1 is a schematic view of a vehicle key system 10 according to the embodiment.

The vehicle key system 10 is a system configured to change lock status of a vehicle 20 through communication performed between a user terminal 11 and the vehicle 20. For example, the vehicle key system 10 is a system capable of locking and unlocking the vehicle 20 by performing electronic key authentication through short-range wireless communication between the user terminal 11, which the user can carry, and the vehicle 20. A specific example of the configuration of the vehicle key system 10 will be described later while referring to FIG. 2. The vehicle key system 10 according to the present embodiment enables the vehicle 20 to be locked with a high level of security, with the user terminal 11 placed inside a vehicle cabin 23, as will be described later.

The user terminal 11 is, for example, a smartphone belonging to a user 12. An application that is a predetermined program for locking and unlocking the vehicle 20 is installed in it.

The vehicle 20 is, for example, a passenger car or the like. For example, the vehicle 20 is an engine vehicle, an electrical vehicle (EV), a hybrid electrical vehicle (HEV), or a plug-in hybrid electrical vehicle (PHEV).

A driving unit 21 applies a driving force to a vehicle body 22 when the vehicle 20 travels. When the vehicle 20 is an engine vehicle, an engine is adopted as the driving unit 21 to be described later. When the vehicle 20 is an EV, a motor is adopted as the driving unit 21 to be described later. When the vehicle 20 is an HEV or a PHEV, a motor and an engine are adopted as the driving unit 21 to be described later.

A door 202A, an example of a vehicle opening-and-closing unit 202 in the embodiment, is opened and closed when the user 12 gets in or out of the vehicle 20.

A touch sensor 205 is disposed on or near the door 202A. The user 12 is able to perform an operation for locking or unlocking the door 202A by touching the touch sensor 205.

Figure 2:
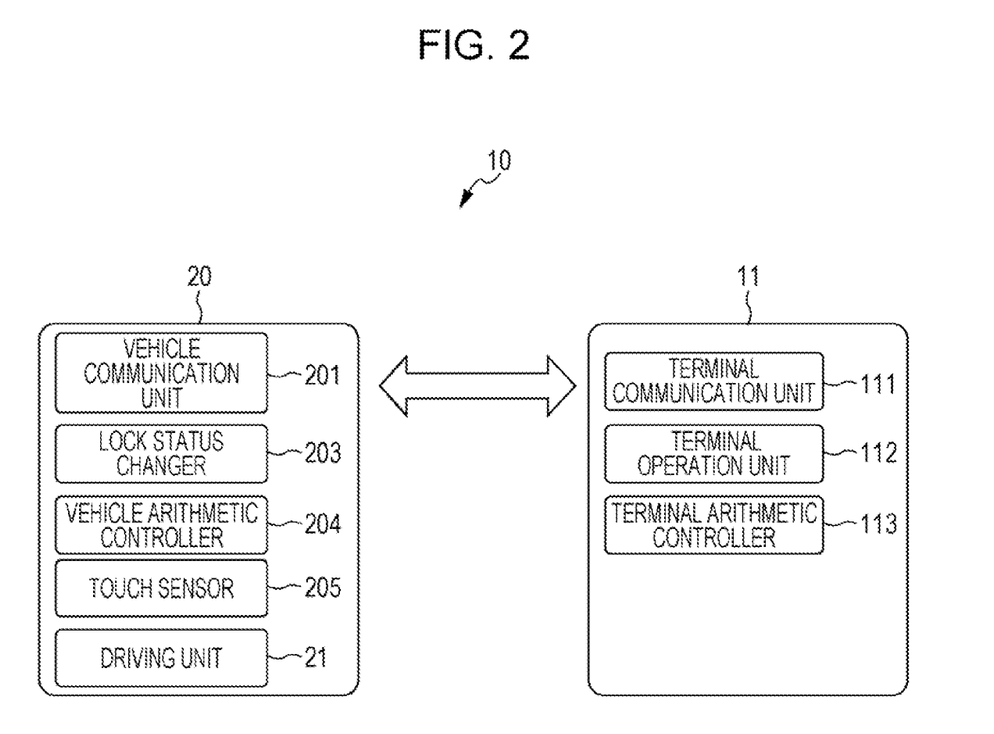
FIG. 2 is a block diagram illustrating the vehicle key system according to the embodiment of the disclosure.

FIG. 2 is a block diagram illustrating the vehicle key system 10. As described earlier, the vehicle key system 10 is a system configured to change lock status of the vehicle 20 through communication performed between the user terminal 11 and the vehicle 20.

The user terminal 11 includes a terminal communication unit 111, a terminal operation unit 112, and a terminal arithmetic controller 113 as its main components in the embodiment. The user terminal 11 is, for example, a smartphone.

The terminal communication unit 111 performs communication with the vehicle 20. For example, the terminal communication unit 111 is a component configured to perform short-range wireless communication such as Bluetooth (registered trademark) and Wi-Fi.

The terminal operation unit 112 is a component configured to receive an operation performed by the user 12, for example, a touch panel.

The terminal arithmetic controller 113 includes a CPU, a RAM, a ROM, and the like, and is, for example, a control circuit having a microcomputer-based configuration.

Besides general application software such as one for voice communication, the user terminal 11 has application software (hereinafter also referred to as "electronic key application") having an electronic key function of the vehicle 20 and having been acquired by downloading from a server apparatus that is not illustrated. The electronic key application is run by the terminal arithmetic controller 113, which is a microcomputer included in hardware of the user terminal 11. Upon execution of setting registration by means of the electronic key application, a unique authentication ID to be used as an electronic key of the vehicle 20 is assigned to the user terminal 11. When a response request signal is received from a vehicle communication unit 201 to be described later, the electronic key application generates an unlocking instruction signal for unlocking the door 202A of the vehicle 20. The unlocking instruction signal includes, for example, information about the time at which this signal is generated, and information about the authentication ID of the electronic key.

The vehicle 20 includes the vehicle communication unit 201, a lock status changer 203, a vehicle arithmetic controller 204, the touch sensor 205, and the driving unit 21.

The vehicle communication unit 201 performs communication with the user terminal 11. As described earlier, the vehicle communication unit 201 is a component configured to perform short-range wireless communication with the terminal communication unit 111 interactively.

The lock status changer 203 changes the lock status of the door 202A from a locked state to an unlocked state, or from an unlocked state to a locked state. For example, the lock status changer 203 is an actuator configured to, based on an instruction given by the user 12 to the user terminal 11 by operating the terminal operation unit 112, unlock or lock the door 202A of the vehicle 20. Changing the lock status by the lock status changer 203 may be embodied in various ways, including, for example, by operating the touch sensor 205, by operating the handle of the door 202A, or by using a cryptographic code keyless entry function.

The vehicle arithmetic controller 204 includes a CPU, a RAM, a ROM, and the like, and is, for example, a control circuit having a microcomputer-based configuration, and is sometimes called "ECU".

The touch sensor 205 and the driving unit 21 have the configuration described earlier.

The electronic key operates as follows. A unique authentication ID is assigned to the vehicle 20 and the user terminal 11. Authentication is successful when the authentication ID transmitted from the user terminal 11 to the vehicle communication unit 201 agrees with the authentication ID having been registered in the vehicle communication unit 201 in advance. Upon successful authentication, it is possible to execute unlocking the door 202A of the vehicle 20 without any need to perform a manual switch operation on the user terminal 11 or a mechanical key operation. Moreover, after the unlocking, it is possible to start the engine just by operating an engine switch, etc. provided in the vehicle cabin.

The user terminal 11 is not limited to a smartphone. The user terminal 11 may be a communication device having a touch-operable display and an input operation interface, for example, a tablet terminal, a wearable terminal, a personal digital assistant (PDA), or the like. Alternatively, the user terminal 11 may be a so-called smart key, etc. dedicated to the electronic key function of the vehicle 20.

Figure 3:
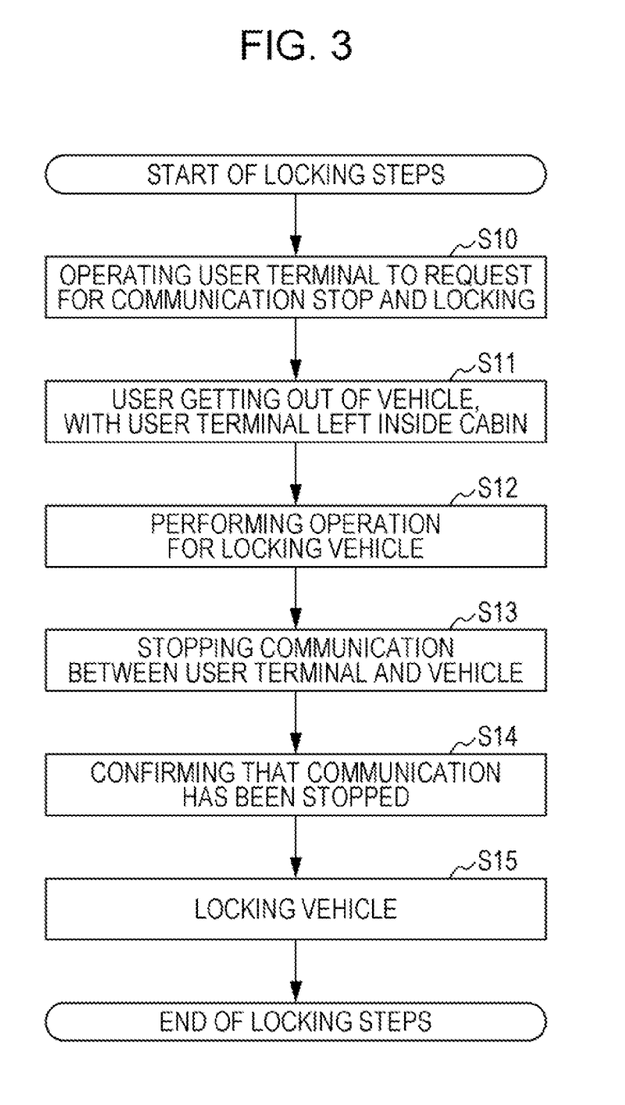
FIG. 3 is a flowchart illustrating steps of performing locking using the vehicle key system according to the embodiment of the disclosure.
Figure 4:
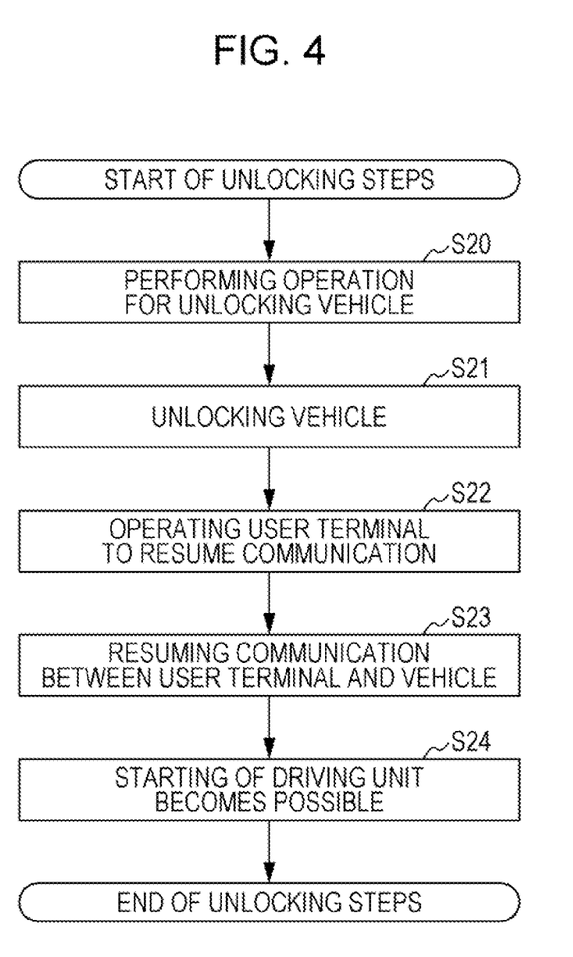
FIG. 4 is a flowchart illustrating steps of performing unlocking using the vehicle key system according to the embodiment of the disclosure.

With reference to FIGS. 3 and 4, a method for locking and unlocking the vehicle 20 using the vehicle key system 10 having the configuration described earlier will now be explained. The present embodiment can be applied to, for example, a case where the user 12 who enjoys outdoor activity such as surfing locks the vehicle 20, with the user terminal 11 left inside the vehicle cabin 23.

FIG. 3 is a flowchart illustrating steps of performing locking using the vehicle key system 10.

In a step S10, the user 12 operates the user terminal 11 to make a communication stop request and a locking request. For example, the user 12 launches the electronic key application of the user terminal 11 by operating the user terminal 11. After the launching, the user 12 makes the communication stop request and the locking request by performing an operation on the electronic key application. On the electronic key application of the user terminal 11, this terminates setting of the communication stop request and the locking request. An electric signal that represents the communication stop request and the locking request is transmitted to the vehicle arithmetic controller 204 of the vehicle 20.

In a step S11, the user 12 gets out of the vehicle 20, with the user terminal 11 left inside the vehicle cabin 23. For example, if the user 12 carries the user terminal 11, which is an electronic device, when doing activity such as surfing, there is a risk that the user terminal 11 might break down. Moreover, if the user terminal 11 is placed near the vehicle 20, there is a risk that the vehicle 20 might be stolen by a third party by using the user terminal 11. Therefore, in the present embodiment, the user 12 gets out of the vehicle 20, with the user terminal 11 left inside the vehicle cabin 23.

In a step S12, the user 12 performs a locking request operation for putting the vehicle 20 into a locked state from an unlocked state. For example, the user 12 performs the locking request operation from outside the vehicle 20 by touch-operating the touch sensor 205. A signal that indicates that the locking request operation has been done is transmitted to the vehicle arithmetic controller 204. The locking request operation for locking the vehicle 20 may be performed using a timer lock function, which is a function of making a prescheduled locking request by the user terminal 11.

The reason why the locking request operation is performed in the step S12 is that, if the door 202A were locked immediately after closing the door 202A, the user 12 would have to perform the operation of the electronic key application again when having forgotten something inside the vehicle cabin 23. Moreover, performing this request operation makes it possible to confirm the intent of the user 12 again. In the step S12, for enhanced security, the user 12 may perform the locking operation on the user terminal 11 itself or the electronic key application. In the present embodiment, there is first waiting time, which is short, from completion of the locking request operation to actual locking of the door 202A in a step S15. The first waiting time continues for, for example, a few seconds.

In a step S13, the communication between the user terminal 11 and the vehicle 20 is stopped. For example, the vehicle arithmetic controller 204 outputs, to the user terminal 11, information indicating that the locking request operation has been done in a situation where there exists the user terminal 11 inside the vehicle cabin 23. Then, after a lapse of second waiting time, the terminal arithmetic controller 113 stops the radio communication between the terminal communication unit 111 of the user terminal 11 and the vehicle communication unit 201 of the vehicle 20. The second waiting time is shorter than the aforementioned first waiting time.

Stopping the communication between the terminal communication unit 111 and the vehicle communication unit 201 based on the operation of the terminal operation unit 112 and the touch sensor 205 by the user 12 makes it possible to enhance the security of the vehicle 20 based on the intent of the user 12. That is, even if a third party who has a malicious intent breaks into the vehicle 20 and performs an unlocking operation on the user terminal 11, the malicious person will be unable to start the driving unit 21 of the vehicle 20 and thus will be unable to steal the vehicle 20 because the user terminal 11 is not in communication with the vehicle 20 by radio.

In a step S14, the vehicle arithmetic controller 204 confirms that the communication has been stopped. For example, the vehicle arithmetic controller 204 issues a key response request from the vehicle communication unit 201 to the terminal communication unit 111 of the user terminal 11. As already described, the radio communication with the terminal communication unit 111 of the user terminal 11 has been stopped. Therefore, there is no reply from the terminal communication unit 111 to the vehicle communication unit 201. Due to the lack of a reply, the vehicle arithmetic controller 204 confirms that the terminal communication unit 111 of the user terminal 11 is in a communication-stopped state.

In the present embodiment, the step S14 may be omitted. For example, the step S14 may be omitted by locking the vehicle 20 after the lapse of the aforementioned second waiting time following the end of the step S13. With this omission, the vehicle arithmetic controller 204 advances the process from the step S13 to the step S15.

In the step S15, the vehicle 20 is locked. For example, based on an instruction given by the vehicle arithmetic controller 204, the lock status changer 203 puts the door 202A into a locked state. In this step, the driving unit 21 may be put into a start-disabled state.

The foregoing is an explanation of locking steps according to the present embodiment. Executing the locking steps described above enables the user 12 to thoroughly enjoy the activity such as surfing, with the user terminal 11 left inside the vehicle cabin 23, without having to worry about the vehicle 20 getting stolen.

FIG. 4 is a flowchart illustrating steps of performing unlocking using the vehicle key system 10.

In a step S20, the user 12 having returned to the vehicle 20 after ending the activity performs an operation for unlocking the vehicle 20. In this step, the user 12 is unable to perform unlocking using the user terminal 11 because the user terminal 11 exists inside the vehicle cabin 23 and because the user terminal 11 is in a communication-stopped state. The user 12 uses, for example, the aforementioned cryptographic code keyless entry function so as to perform an operation for unlocking the door 202A of the vehicle 20. The operation for cryptographic code keyless entry may be performed on the touch sensor 205 described earlier or on a handle unit provided on a rear gate. Moreover, the operation for cryptographic code keyless entry may be performed on a keyboard provided on a B pillar of the vehicle 20.

In a step S21, in the vehicle 20, based on an instruction given by the vehicle arithmetic controller 204, the lock status changer 203 unlocks the door 202A. That is, the lock status of the door 202A is changed from a locked state to an unlocked state. In this step, since the driving unit 21 is in a start-disabled state, the driving unit 21 does not start even if the start switch is pressed.

In a step S22, the user 12 performs an unlocking operation of the electronic key application by operating the terminal operation unit 112 of the user terminal 11 inside the vehicle cabin 23. For example, authenticating the face or fingerprint of the user 12, a passcode input, or the like can be adopted as this operation. Such a security-disarming operation may be performed on the user terminal 11 itself or the electronic key application.

In a step S23, radio communication between the terminal communication unit 111 of the user terminal 11 and the vehicle communication unit 201 of the vehicle 20 is resumed. For example, the radio communication between the vehicle 20 and the user terminal 11 restarts as a result of recovery of the functions of the terminal communication unit 111 of the user terminal 11.

By performing processing in the steps S22 and S23, it is possible to identify the user 12 and prevent a third party who is not the user 12 from resuming the communication. Furthermore, the user 12 performs an operation for resuming the radio communication on the electronic key application of the user terminal 11. As a result of this operation, a signal for resuming the radio communication is transmitted from the terminal communication unit 111 of the user terminal 11 to the vehicle communication unit 201 of the vehicle 20, and the two become able to communicate with each other. The terminal arithmetic controller 113 transmits, to the vehicle arithmetic controller 204 via the terminal communication unit 111 and the vehicle communication unit 201, a signal indicating that the security of the user terminal 11 has been disarmed.

In a step S24, the vehicle arithmetic controller 204 puts the driving unit 21 of the vehicle 20 into a start-enabled state. Therefore, the user 12 having finished the activity is able to start the driving unit 21 by, for example, pressing down the start switch of the vehicle 20, and thus to drive the vehicle 20.

The foregoing is an explanation of unlocking steps according to the present embodiment. In the present embodiment, since the starting of the driving unit 21 becomes possible in a state in which the door 202A has been unlocked and, in addition, in which the terminal communication unit 111 and the vehicle communication unit 201 have become able to communicate with each other, it is possible to further enhance the security of the vehicle 20 when locked.

A case where a third party who has a malicious intent breaks into the vehicle 20 while the vehicle 20 is locked will now be described. In this case, if the key of the vehicle 20 is operated before face authentication, fingerprint authentication, or the like is performed, an alerting device of the vehicle 20, for example, an alarm, outputs alerting sound. Therefore, it is possible to further enhance the security of the vehicle 20 when parked.

The foregoing is an explanation of a vehicle key system according to the present embodiment, and a vehicle locking method using the same.

Technical concepts that can be grasped from the present embodiment described above, together with their effects, will be described below.

A vehicle key system according to an aspect of the disclosure is configured to change lock status of a vehicle through communication performed between a user terminal and the vehicle. The user terminal includes a terminal communication unit configured to communicate with the vehicle. The vehicle includes a vehicle communication unit configured to communicate with the user terminal, and a vehicle opening-and-closing unit. Communication between the terminal communication unit and the vehicle communication unit is stopped when an operation for putting the vehicle opening-and-closing unit into a locked state is performed, with the user terminal placed inside the vehicle. In the vehicle key system according to the aspect of the disclosure, the communication between the terminal communication unit and the vehicle communication unit is stopped when the user locks the vehicle, with the user terminal placed inside the vehicle cabin intentionally. For this reason, even if a third party who has broken into the vehicle cabin operates the user terminal when the vehicle is locked, the vehicle is disabled to start; therefore, it is possible to enhance the security of the vehicle when locked.

In the vehicle key system according to the aspect of the disclosure, the user terminal may further include a terminal operation unit configured to receive an operation performed by a user, the vehicle may further include a lock status changer configured to change a state of the vehicle opening-and-closing unit, and the communication between the terminal communication unit and the vehicle communication unit may be stopped when the user performs a locking request operation by operating the terminal operation unit and performs a locking operation of locking the vehicle opening-and-closing unit by operating the lock status changer. With the vehicle key system according to an aspect of the disclosure, it is possible to enhance the security of the vehicle based on the intent of the user by stopping the communication between the terminal communication unit and the vehicle communication unit based on the operation of the terminal operation unit and the lock status changer by the user.

In the vehicle key system according to the aspect of the disclosure, the vehicle may further include a vehicle arithmetic controller, and based on operating the lock status changer by the user, the vehicle arithmetic controller may lock the vehicle opening-and-closing unit after the communication between the terminal communication unit and the vehicle communication unit is stopped. With the vehicle key system according to an aspect of the disclosure, since the vehicle opening-and-closing unit is locked after the communication is stopped, it is possible to prevent the vehicle opening-and-closing unit from being locked carelessly in a state in which the terminal communication unit and the vehicle communication unit communicate with each other.

In the vehicle key system according to the aspect of the disclosure, the vehicle may further include a vehicle arithmetic controller, and a driving unit configured to apply a driving force to a vehicle body, and the vehicle arithmetic controller may make the driving unit operable when, by an operation performed by the user, the vehicle opening-and-closing unit becomes unlocked and the communication between the terminal communication unit and the vehicle communication unit becomes possible. With the vehicle key system according to an aspect of the disclosure, since the starting of the driving unit becomes possible in a state in which the vehicle opening-and-closing unit has been unlocked and, in addition, in which the terminal communication unit and the vehicle communication unit have become able to communicate with each other, it is possible to further enhance the security of the vehicle when locked.

A vehicle locking method according to an aspect of the disclosure is a method of changing lock status of a vehicle through communication performed between a user terminal and the vehicle. The user terminal includes a terminal communication unit configured to communicate with the vehicle. The vehicle includes a vehicle communication unit configured to communicate with the user terminal, and a vehicle opening-and-closing unit. Communication between the terminal communication unit and the vehicle communication unit is stopped when an operation for putting the vehicle opening-and-closing unit into a locked state is performed, with the user terminal placed inside the vehicle.

In the vehicle locking method according to the aspect of the disclosure, the communication between the terminal communication unit and the vehicle communication unit is stopped when the user locks the vehicle, with the user terminal placed inside the vehicle cabin intentionally. For this reason, even if a third party who has broken into the vehicle cabin operates the user terminal when the vehicle is locked, the vehicle is disabled to start; therefore, it is possible to enhance the security of the vehicle when locked.

Although an embodiment of the disclosure has been described above, the scope of the disclosure is not limited thereto. The foregoing embodiment may be modified within a range of not departing from the spirit of the disclosure. The foregoing exemplary features may be combined with one another.

For example, although the door 202A has been described as an example of the vehicle opening-and-closing unit 202 while referring to FIG. 1, any other part of the vehicle may be adopted as the vehicle opening-and-closing unit. For example, the vehicle opening-and-closing unit 202 may be a window, a hatch, or the like.

It has been described while referring to FIG. 3 that, in the step S13, the user terminal 11 takes the initiative in stopping the communication. Instead, based on an instruction given by the vehicle arithmetic controller 204 of the vehicle 20, the vehicle communication unit 201 may take the initiative in stopping the communication.

The invention claimed is:

1. A vehicle key system configured to change a lock status of a vehicle through communication performed between a user terminal and the vehicle,
the user terminal comprising a terminal communication unit configured to communicate with the vehicle,
the vehicle comprising:
  a vehicle communication unit configured to communicate with the user terminal; and
  a vehicle opening-and-closing unit;
  a driving unit configured to generate driving force for the vehicle to travel; and
  one or more control circuits configured to:
    disable communication between the terminal communication unit and the vehicle communication when an operation for putting the vehicle opening-and-closing unit into a locked state is performed, with the user terminal placed inside the vehicle;
    enable the communication between the terminal communication unit and the vehicle communication unit when an operation for putting the vehicle opening-and-closing unit into an unlocked state is performed, with the user terminal placed inside the vehicle; and
    based on the communication between the terminal communication unit and the vehicle communication unit, control the driving unit to be operable.

2. The vehicle key system according to claim 1, wherein the user terminal further comprises a terminal operation unit configured to receive an operation performed by a user,
the vehicle further comprises a lock status changer configured to change a state of the vehicle opening-and-closing unit, and
the communication between the terminal communication unit and the vehicle communication unit is stopped when the user performs, as the operation, a locking request operation by operating the terminal operation unit and a locking operation of locking the vehicle opening-and-closing unit by operating the lock status changer.

3. The vehicle key system according to claim 2, wherein the one or more control circuits comprise a vehicle arithmetic controller of the vehicle, and
the vehicle arithmetic controller is configured to, based on the operating the lock status changer by the user, lock the vehicle opening-and-closing unit after the communication between the terminal communication unit and the vehicle communication unit is stopped.

4. A vehicle locking method of changing a lock status of a vehicle through communication performed between a user terminal and the vehicle,
the user terminal comprising a terminal communication unit configured to communicate with the vehicle,
the vehicle comprising:
  a vehicle communication unit configured to communicate with the user terminal;
  a vehicle opening-and-closing unit; and
  a driving unit configured to generate driving force for the vehicle to travel,
the vehicle locking method comprising:
  stopping communication between the terminal communication unit and the vehicle communication unit when an operation for putting the vehicle opening-and-closing unit into a locked state is performed, with the user terminal placed inside the vehicle;
  enabling the communication between the terminal communication unit and the vehicle communication unit when an operation for putting the vehicle opening-and-closing unit into an unlocked state is performed, with the user terminal placed inside the vehicle; and
  based on the communication between the terminal communication unit and the vehicle communication unit, control the driving unit to be operable.

5. The vehicle key system according to claim 1, wherein a vehicle controller is configured to confirm that the communication is disabled before controlling the vehicle operating-and-closing unit to lock the vehicle.

6. The vehicle key system according to claim 1,
wherein a vehicle controller is configured to:
  receive an unlocking vehicle operation performed outside of the vehicle; and
  in response to the unlocking vehicle operation, control the vehicle opening-and-closing unit to unlock the vehicle, and
wherein a terminal controller is configured, in response to an unlocking user terminal operation, to activate the terminal communication unit to enable the communication between the user terminal and the vehicle.

* * * * *